(12) United States Patent
Jeol et al.

(10) Patent No.: US 9,856,375 B2
(45) Date of Patent: Jan. 2, 2018

(54) POLYAMIDE COMPOSITION

(71) Applicant: RHODIA OPERATIONS, Paris (FR)

(72) Inventors: Stéphane Jeol, Cumming, GA (US); Thierry Badel, Lyons (FR); Jean-François Thierry, Francheville (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 15/036,724

(22) PCT Filed: Nov. 7, 2014

(86) PCT No.: PCT/EP2014/074091
§ 371 (c)(1),
(2) Date: May 13, 2016

(87) PCT Pub. No.: WO2015/071198
PCT Pub. Date: May 21, 2015

(65) Prior Publication Data
US 2016/0289448 A1    Oct. 6, 2016

(30) Foreign Application Priority Data
Nov. 13, 2013 (EP) .................. 13306549

(51) Int. Cl.
| | | |
|---|---|---|
| *C08L 77/06* | (2006.01) | |
| *B29C 49/00* | (2006.01) | |
| *B29C 45/00* | (2006.01) | |
| *B29B 9/10* | (2006.01) | |
| *C08G 69/26* | (2006.01) | |
| *B29K 77/00* | (2006.01) | |
| *B29K 105/16* | (2006.01) | |

(52) U.S. Cl.
CPC .......... *C08L 77/06* (2013.01); *B29B 9/10* (2013.01); *B29C 45/0001* (2013.01); *B29C 49/0005* (2013.01); *C08G 69/26* (2013.01); *B29C 2045/0091* (2013.01); *B29K 2077/00* (2013.01); *B29K 2105/16* (2013.01); *C08L 2201/08* (2013.01); *C08L 2203/20* (2013.01); *C08L 2205/02* (2013.01)

(58) Field of Classification Search
CPC . C08L 77/06; B29C 45/0001; B29C 49/0005; B29B 9/10
See application file for complete search history.

(56) References Cited

U.S. PATENT DOCUMENTS

| | | | |
|---|---|---|---|
| 4,945,129 A | 7/1990 | Mason et al. | |
| 6,160,080 A | 12/2000 | Cucinella et al. | |
| 6,525,166 B1 | 2/2003 | Di Silvestro et al. | |
| 2004/0113308 A1* | 6/2004 | Clement | C08L 77/00 264/210.8 |
| 2014/0323631 A1 | 10/2014 | Gabriel et al. | |

FOREIGN PATENT DOCUMENTS

| | | | |
|---|---|---|---|
| WO | 9724388 A1 | 7/1997 | |
| WO | 9964496 A1 | 12/1999 | |
| WO | 2013004531 A1 | 1/2013 | |
| WO | 2013004548 A1 | 1/2013 | |
| WO | 2013075982 A1 | 5/2013 | |
| WO | WO 2013/075982 A1 * | 5/2013 | .............. C08L 77/00 |

* cited by examiner

*Primary Examiner* — Robert Harlan
(74) *Attorney, Agent, or Firm* — Osha Liang LLP

(57) ABSTRACT

The invention pertains to A polyannide composition [composition (C)] comprising: —from 20 to 95% wt of at least one polyamide [polyamide (A)]; —from 1 to 30% wt of at least one branched polyamide different from polyamide (A), said branched polyamide comprising recurring units derived from polycondensation of a mixture [mixture (B)] comprising: —at least one polyamine monomer comprising at least three amine functional groups selected from the group consisting of secondary amine group of formula —NH— and primary amine group of formula -MH$_2$ [monomer (FN)], and—ϵ-caprolactam (or derivates thereof); said branched polyamide possessing a concentration of amine end groups (AEG) and a concentration of carboxylic end groups (CEG) such that the difference AEG–CEG is of at least 100 meq/kg [polyamide (B)]; and—from 0.01 to 3.5% wt of at least one thermal stabilizer [stabilizer (S)], —optionally, from 0 to 60% wt of at least one filler [filler (F)]; —optionally, from 0 to 20% wt of at least one impact modifying rubber [rubber (I)]; —optionally, from 0 to 20% wt of other conventional additives, with above % wt being referred to the total weight of composition (C).

20 Claims, No Drawings

POLYAMIDE COMPOSITION

CROSS-REFERENCE TO RELATED APPLICATION

This application is a U.S. national stage entry under 35 U.S.C. §371 of International Application No. PCT/EP2014/074091, filed Nov. 7, 2014, which claims priority to European application No. 13306549.0 filed Nov. 13, 2013. The entire content of each of these applications is hereby incorporated herein by reference.

TECHNICAL FIELD

The present invention relates to the field of polyamide compositions having improved long term high temperature ageing characteristics.

BACKGROUND ART

Polyamides are synthetic polymers widely used for the manufacture of diverse shaped articles, including moulded and injected parts, which are often proposed for the high end electrical, electronic, and automotive industry.

In these fields of use, the moulded polyamide article during its normal useful lifetime is in contact with a heat source which frequently attains and/or which attains for a longer period temperatures largely exceeding 100° C. The heat source may be a heat producing device or a heated device or may be the surrounding environment wherein the moulded article is placed. Examples of heated devices or heat generating devices are engines, or elements thereof, and electronic devices such as semiconductors. For the automotive segment high-temperature-use application are regularly found in so-called under-the-hood or under-the-bonnet applications, herein referred to as high temperature automotive applications. Therefore, the invention in particular relates to polyamide suitable for the manufacture of moulded articles for use in the electro-, electronic, and automotive industry.

Moulded articles for the electrical, electronic and automotive industry and moulding compositions based on polyamides generally have to comply with a complex property profile, including, for the compositions as moulded, good dimensional stability, high heat distortion temperature (HDT) and good mechanical properties, such as a high tensile strength, tensile modulus and fatigue. Polyamide materials generally tend to show a decrease in mechanical properties due to thermal degradation of the polymer. This effect is called heat ageing. This effect can occur to an undesirable extent. In particular with polyamides as the thermoplastic polymer, the deteriorating effect of exposure to high temperatures can be very dramatic.

In attempts to improve heat aging characteristics, it has been conventional practice to add heat stabilizers to polyamide compositions. The function of a heat stabilizer is to better retain the properties of the composition upon exposure of the moulded article to elevated temperature. When using a heat stabilizer, the useful lifetime of the moulded material can be extended significantly, depending on the type of material, use conditions and type and amount of heat stabilizer. Examples of heat stabilizers typically used in polyamides are organic stabilizers, like phenolic antioxidants and aromatic amines, and copper, either in the form of a copper salt in combination with potassium iodide or potassium bromide, or in the form of elementary copper, and metal powders, in particular iron powders.

Existing technologies, while leading to improvements of long-term heat aging resistance, are nevertheless insufficient for more demanding applications, involving exposure to higher temperatures; in many applications, retention of mechanical properties after long-term exposure to temperatures as high as 160° C., or even 180-200° C. and higher becomes a basic requisite. The number of specialty applications, requiring compositions with improved heat ageing properties is also increasing.

The aim of the invention is therefore to provide polyamide compositions, which have better heat ageing properties than the known compositions, thereby providing for the possibility to make moulded articles that can be used at higher continuous use temperatures than the moulded articles prepared with the known compositions and which possess outstanding impact strength.

Within this scenario, U.S. Pat. No. 4,945,129 (ALLIED SIGNAL) Jul. 31, 1990 discloses a polyamide composition comprising (i) an amine-terminated polyamide, which is preferably of polycaprolactam-type, and which can comprise branching materials such as Jeffamine products (i.e. propylene oxide triamines), or tri- and tetra-functional ethylene amines; (ii) another additional polyamide and (iii) an olefin reactive copolymer. The composition can further comprise stabilizers and inhibitors of oxidative, thermal and UV light degradation, with combinations of Group I metal halides and cuprous halides being mentioned. Such compositions are shown as possessing improved impact strength, in particular at low temperature.

Further, WO 2013/004531 (DSM IP ASSETS BV) Jan. 10, 2013 discloses a polyamide composition comprising:
- a pre-polymer Y, obtained from polycondensation of polyfunctional monomer and mixture of AA/BB monomers and AB monomers, having a molecular weight of 600-3500 g/mol, said pre-polymer having preferably unbalanced end groups, and in particular an excess of amine end groups;
- a first linear pre-polyamide X1 predominantly consisting of AA-BB repeating units; and
- a second linear pre-polyamide X2 predominantly consisting of AB repeating units. The composition can further comprise usual additives, e.g. heat stabilizers and antioxidants. The above composition is mixed in the molten state to provide by reactive extrusion a high molecular weight branched polyamide, in which the difference between concentration of amine and carboxylic acid end groups (AEG−CEG) ranges generally of from 0 to 35 meq/kg (i.e. providing for a slight excess of amine end groups).

Similarly, WO 2013/004548 (DSM IP ASSETS BV) Jan. 10, 2013 discloses a polyamide composition comprising:
- a pre-polymer Y, obtained from polycondensation of polyfunctional monomer and mixture of AA/BB monomers, having a molecular weight of 600-3500 g/mol, said pre-polymer having preferably unbalanced end groups, and in particular an excess of amine end groups;
- a linear pre-polyamide X consisting of AA-BB repeating units. The composition can further comprise usual additives, e.g. heat stabilizers and antioxidants. The above composition is mixed in the molten state to provide by reactive extrusion a high molecular weight branched polyamide, in which the difference between concentration of amine and carboxylic acid end groups (AEG−CEG) ranges generally of from 0 to 35 meq/kg (i.e. providing for a slight excess of amine end groups).

The Applicant has now found that by the incorporation in compounds based on polyamides of a combination of a well-defined amount of a copper-containing stabilizer and a well defined amount of a particular branched polyamide comprising a significant amount of amine end groups in excess over carboxylic acid end group is effective in delivering outstanding synergetic heat aging stability effect, in particular delivering outstanding retention of mechanical properties even after long term exposure to temperatures as high as 210° C., while simultaneously providing toughening effect.

SUMMARY OF INVENTION

The invention thus pertain to a polyamide composition [composition (C)] comprising:
from 20 to 95% wt of at least one polyamide [polyamide (A)];
from 1 to 30% wt of at least one branched polyamide different from polyamide (A), said branched polyamide comprising recurring units derived from polycondensation of a mixture [mixture (B)] comprising:
(i) at least one polyamine monomer comprising at least three amine functional groups selected from the group consisting of secondary amine group of formula —NH— and primary amine group of formula —NH$_2$ [monomer (FN)], and
(ii) ε-caprolactam (or derivates thereof);
said branched polyamide possessing a concentration of amine end groups (AEG) and a concentration of carboxylic end groups (CEG) such that the difference AEG–CEG is of at least 100 meq/kg [polyamide (B)]; and
from 0.01 to 3.5% wt of at least one thermal stabilizer [stabilizer (S)],
optionally, from 0 to 60% wt of at least one filler [filler (F)];
optionally, from 0 to 20% wt of at least one impact modifying rubber [rubber (I)];
optionally, from 0 to 10% wt of other conventional additives,
with above % wt being referred to the total weight of composition (C).

The Applicant has surprisingly found that the simultaneous incorporation of above detailed amounts of a thermal stabilizer (and more particularly a copper-containing stabilizer) and substantially amine-terminated branched polyamide is effective in unexpectedly delivering outstanding synergetic heat aging stability, improving heat aging performances at temperatures as high as 210° C., ensuring outstanding retention of mechanical properties, with substantially better performances over polyamide compounds comprising only a thermal stabilizer (e.g. a copper-containing stabilizer), or combination of this latter with other types of ε-caprolactam-based polyamides.

The Polyamide (A)

The expression "polyamide (A)" is intended to denote any polymer which comprises recurring units which are derived:
from the polycondensation reaction of at least one dicarboxylic acid component (or derivative thereof) and at least one diamine component (or derivative thereof), and/or
from the polycondensation reaction of at least one aminocarboxylic acid and/or at least one lactam.
In addition to said recurring units, the polyamide (A) may comprise recurring units derived from diols, polyhydric alcohols, or other functional compounds including heteroatoms, such as O, P, S.

In certain preferred embodiments, the polyamide (A) of the present invention comprises at least 50 mol %, preferably at least 60 mol %, more preferably at least 70 mol %, still more preferably at least 80 mol % and most preferably at least 90 mol % of such recurring units. Excellent results were obtained when the polyamide (A) essentially consisted of said recurring units, being understood that minor amount (e.g. below 0.5% moles) of recurring units derived from other monomers (e.g. polyfunctional monomers) might still be present without this altering the thermal performances of the polyamide (A).

More precisely, polyamide (A) is obtained by condensation reaction of at least one mixture selected from:
mixtures (M1) comprising at least a diacid [acid (DA)] (or derivative thereof) and at least a diamine [amine (NN)] (or derivative thereof);
mixtures (M2) comprising at least a lactam [lactam (L)];
mixtures (M3) comprising at least an aminocarboxylic acid [aminoacid (AN)]; and
combinations thereof.

Acid (DA) derivatives include notably salts, anhydrides, esters and acid halides, able to form amide groups; similarly, amine (NN) derivatives include notably salts thereof, equally able to form amide groups.

Said acid (DA) can be an aromatic dicarboxylic acid comprising two reactive carboxylic acid groups [acid (AR)] or an aliphatic dicarboxylic acid comprising two reactive carboxylic acid groups [acid (AL)]. For the purpose of the present invention, a dicarboxylic acid is considered as "aromatic" when it comprises one or more than one aromatic group.

Non limitative examples of acids (AR) are notably phthalic acids, including isophthalic acid (IA), and terephthalic acid (TA), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, naphthalene dicarboxylic acids, including 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid.

Among acids (AL), mention can be notably made of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], tetradecanedioic acid [HOOC—(CH$_2$)$_{12}$—COOH], octadecanedioic acid [HOOC—(CH$_2$)$_{16}$—COOH].

Preferably, the acid (DA) used for the manufacture of the polyamide (A) will be an acid (AL), as above detailed, possibly in combination with a minor amount of an acid (AR), as above detailed.

The amine (NN) is generally selected from the group consisting of aliphatic alkylene-diamines, aromatic diamines and mixtures thereof.

Said aliphatic alkylene-diamines are typically aliphatic alkylene diamines having 2 to 18 carbon atoms.

Said aliphatic alkylene diamine is advantageously selected from the group consisting of 1,2-diaminoethane, 1,2-diaminopropane, propylene-1,3-diamine, 1,3-diaminobutane, 1,4-diaminobutane, 1,5-diaminopentane, 1,5-diamino-2-methyl-pentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,8-diamino-2-methyloctane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, 1,12-diaminododecane, and 1,13-diaminotridecane.

The aliphatic alkylene diamine preferably comprises at least one diamine selected from the group consisting of 1,6-diaminohexane, 1,8-diamino-octane, 1,10-diaminodecane, 1,12-diaminododecane and mixtures thereof. More preferably, the aliphatic alkylene diamine comprises at least one diamine selected from the group consisting of 1,6-diaminohexane, 1,10-diaminodecane and mixtures thereof.

The aromatic diamine is preferably selected from the group consisting of meta-xylylene diamine, and para-xylylene diamine.

Preferably, the amine (NN) used for the manufacture of the polyamide (A) will be an aliphatic alkylene diamine, as above detailed, possibly in combination with a minor amount of an aromatic diamine, as above detailed.

Preferred mixtures (M1) are:
mixtures of adipic acid and 1,6-diaminohexane;
mixtures of adipic acid, terephthalic acid and 1,6-diaminohexane;
mixtures of sebacic acid and 1,6-diaminohexane,
mixtures of terephthalic acid and 1,10-diaminodecane,
mixtures of adipic acid, terephthalic acid and 1,10-diaminodecane,
mixtures of adipic acid and 1,10-diaminodecane.

Lactam (L) suitable for use for the manufacture of polyamide (A) can be any of β-lactam or ε-caprolactam.

Preferred mixture (M2) comprises ε-caprolactam.

Aminoacid (AN) suitable for use for the manufacture of polyamide (A) can be selected from the group consisting of 6-amino-hexanoic acid, 9-aminononanoic acid, 10-aminodecanoic acid, 11-aminoundecanoic acid, 12-aminododecanoic acid.

It is still within the scope of the invention the addition to any of mixtures (M1), (M2), (M3) and their combination of one or more than one polyfunctional acid/amine monomers comprising more than two carboxylic acid and amine groups, e.g. polycarboxylic acids having three or more carboxylic acid groups, polyamines having three or more amine groups, polyfunctional diacid including two carboxylic groups and one or more amine groups, polyfunctional diamines including two amine groups and one or more carboxylic acid groups. Incorporation of said polyfunctional acid/amine monomers generally leads to branched structures, star-like or tree-like, such as those notably described in WO 97/24388 (NYLTECH ITALIA [IT]) Jul. 10, 1997 and in WO 99/64496 (NYLTECH ITALIA [IT];) Dec. 16, 1999.

It is also further understood that one or more than one end capping agent [agent (M)] can be added to any of mixtures (M1), (M2), (M3), and their combinations for the manufacture of polyamide (A), without this departing from the scope of the invention. The agent (M) is generally selected from the group consisting of an acid comprising only one reactive carboxylic acid group [acid (MA)] and an amine comprising only one reactive amine group [agent (MN)].

Acid (MA) is preferably selected from the group consisting of acetic acid, propionic acid, butyric acid, valeric acid, caproic acid, caprylic acid, lauric acid, stearic acid, cyclohexanecarboxylic acid, benzoic acid, preferably from acetic acid and benzoic acid.

Amine (MN) is preferably selected from the group consisting of methylamine, ethylamine, butylamine, hexylamine, octylamine, benzylamine, dodecylamine, cyclohexylamine.

Said polyamide (A) generally comprises at least 50% moles of recurring units of any of formula (I) or formula (II) [recurring units ($R_{PA}$)] (with respect to the total moles of recurring units of polyamide (A)):

—NH—R$^1$—CO—  formula (I):

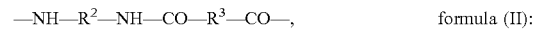

—NH—R$^2$—NH—CO—R$^3$—CO—,  formula (II):

wherein:
$R^1$, equal to or different from each other at each occurrence, is a divalent hydrocarbon group having from 3 to 17 carbon atoms;
$R^2$, equal to or different from each other at each occurrence, is a divalent hydrocarbon group having from 2 to 18 carbon atoms; and
$R^3$, equal to or different from each other at each occurrence, is a bond or a divalent hydrocarbon group having from 1 to 16 carbon atoms.

The polyamide (A) of the inventive composition is preferably an aliphatic polyamide, that is to say that $R^1$, $R^2$ and $R^3$ are aliphatic group.

Exemplary recurring units ($R_{PA}$) of the polyamide (A) are notably:
(j) —NH—(CH$_2$)$_5$—CO—, i.e. recurring units which can be notably obtained via polycondensation reaction of ε-caprolactam [recurring units ($R_6$)];
(jj) —NH—(CH$_2$)$_8$—CO—, i.e. recurring units which can be notably obtained via polycondensation reaction of 9-aminononanoic acid [recurring units ($R_9$)];
(jjj) —NH—(CH$_2$)$_9$—CO—, i.e. recurring units which can be notably obtained via polycondensation reaction of 10-aminodecanoic acid [recurring units ($R_{10}$)];
(jv) —NH—(CH$_2$)$_{10}$—CO—, i.e. recurring units which can be notably obtained via polycondensation reaction of 11-aminoundecanoic acid [recurring units ($R_{11}$)];
(v) —NH—(CH$_2$)$_{11}$—CO—, i.e. recurring units which can be notably obtained via polycondensation reaction of laurolactam [recurring units ($R_{12}$)];
(vj) —NH—(CH$_2$)$_6$—NH—CO—(CH$_2$)$_4$—CO—, i.e. recurring units which can be notably obtained via polycondensation reaction of hexamethylene diamine and adipic acid [recurring units ($R_{6,6}$)];

(vjj) —NH—$(CH_2)_6$—NH—CO—$(CH_2)_{10}$—CO—, i.e. recurring units which can be notably obtained via polycondensation reaction of hexamethylene diamine and dodecanedioic acid [recurring units ($R_{6,12}$)];

(vjjj) —NH—$(CH_2)_6$—NH—CO—$(CH_2)_{12}$—CO—, i.e. recurring units which can be notably obtained via polycondensation reaction of hexamethylene diamine and tetradecanedioic acid [recurring units ($R_{6,14}$)];

(jx) —NH—$(CH_2)_{10}$—NH—CO—$(CH_2)_{10}$—CO—, i.e. recurring units which can be notably obtained via polycondensation reaction of decamethylene diamine and dodecanedioic acid [recurring units ($R_{10,12}$)];

(x) —NH—$(CH_2)_6$—NH—CO—$(CH_2)_7$—CO—, i.e. recurring units which can be notably obtained via polycondensation reaction of hexamethylene diamine and azelaic acid (otherwise known as nonanedioic acid) [recurring units ($R_{6,9}$)];

(xj) —NH—$(CH_2)_{12}$—NH—CO—$(CH_2)_{10}$—CO—, i.e. recurring units which can be notably obtained via polycondensation reaction of dodecamethylene diamine and dodecanedioic acid [recurring units ($R_{12,12}$)];

(xjj) —NH—$(CH_2)_{10}$—NH—CO—$(CH_2)_8$—CO—, i.e. recurring units which can be notably obtained via polycondensation reaction of decamethylene diamine and decanedioic acid [recurring units ($R_{10,10}$)];

(xjjj) —NH—$(CH_2)_4$—NH—CO—$(CH_2)_4$—CO—, i.e. recurring units which can be notably obtained via polycondensation reaction of 1,4-butanediamine and adipic acid [recurring units ($R_{4,6}$)];

(xjv) —NH—$(CH_2)_4$—NH—CO—$(CH_2)_8$—CO—, i.e. recurring units which can be notably obtained via polycondensation reaction of 1,4-butanediamine and sebacic acid [recurring units ($R_{4,10}$)], (xv) —HN—$(CH_2)_6$—NH—CO—$(CH_2)_8$—CO—, i.e. recurring units which can be notably obtained via polycondensation reaction of 1,6-hexamethylenediamine and sebacic acid [recurring units ($R_{6,10}$)];

(xvi) —HN—$(CH_2)_{10}$—NH—CO—$(CH_2)_4$—CO—, i.e. recurring units which can be notably obtained via polycondensation reaction of 1,10-decamethylenediamine and adipic acid [recurring units ($R_{10,6}$)];

More than 50% moles, preferably more than 60% moles, even more preferably more than 70% moles of recurring units of the polyamide (A) are recurring units ($R_{PA}$), as above detailed.

Recurring units ($R_{PA}$) of the polyamide (A) may be all the same, so that the polyamide (A) is a homopolyamide, or may be of different types, so that the polyamide (A) is a co-polyamide.

According to certain preferred embodiments, polyamide (A) consists essentially of recurring units ($R_{6,6}$), as above detailed, that is to say polyamide (A) is a homo-polyamide PA66, being understood that end-chain, defects and other irregularities can be present in the polyamide (A) chain, without this affecting the properties thereof.

Eng groups of polyamide (A) can be of any type, including non-functional (end-capped) end groups, carboxylic acid end groups (CEG) and amine end groups (AEG).

It is nevertheless generally understood that according to preferred embodiments, polyamide (A) comprises a concentration of carboxylic acid end groups exceeding concentration of amine end groups.

To this aim, polyamide (A) can be preferably manufactured by polycondensation reaction in the presence of an excess of carboxylic acid groups in the monomers mixture, this excess being generally under the form of the use of an excess of at least one carboxylic acid comprising two or more than two carboxylic acid groups, preferably more than two.

The composition (C) will generally comprise at least 20% wt, preferably at least 30% wt, more preferably at least 35% wt of polyamide (A) as above detailed, with respect to the total weight of the composition (C). Still, the composition (C) comprises usually at most 95% wt, preferably at most 80% wt, even more preferably at most 70% wt of polyamide (A) as above detailed, with respect to the total weight of the composition (C).

The Polyamide (B)

As said, the composition (C) comprises from 1 to 30% wt of at least one branched polyamide different from polyamide (A), said branched polyamide comprising recurring units derived from polycondensation of a mixture [mixture (B)] comprising:

at least one monomer (FN), as above defined, and

ε-caprolactam (or derivatives thereof);

said branched polyamide possessing a AEG and a CEG such that the difference AEG–CEG is of at least 100 meq/kg [polyamide (B)].

The monomer (FN) is preferably a trifunctional polyamine monomer comprising three amine groups, as detailed above, or a tetrafunctional polyamine monomer comprising four amine groups, as detailed above.

As examples of monomers (FN), mention can be made of tris(aminoalkyl)amines, such as tris(2-aminoethyl)amine (TREN); polyoxyalkylenetriamines, such as for example Jeffamine T® from Huntsman, including Jeffamine T403® (polyoxypropylenetriamine); polyalkylenepolyamines such as polyethyleneimine, which may advantageously have variable molecular weight, 1,8-diamino-4-aminomethyl-octane (TAN) and dialkylenetriamines, such as diethylenetriamine (DETA), bis(hexamethylene)triamine (BHT), and cyclohexane-1,3,5-triamine.

Preferred polyfunctional monomers are bis(hexamethylene)triamine (BHT), tris(2-aminoethyl)amine (TREN), 1,8-diamino-4-aminomethyl-octane (TAN) and combinations thereof.

The expression 'derivative thereof' when used in combination with the expression 'ε-caprolactam' is intended to denote whichever derivative which is susceptible of reacting in polycondensation conditions to yield an amide bond. Examples of amide-forming derivatives include the corresponding amino-acid linear compound, monoalkyl esters, such as a mono-methyl, ethyl or propyl ester, of the same; a mono-aryl ester thereof; a mono-acid halide thereof; a mono-acid amide thereof, a mono-carboxylate salt and a mono-ammonium salt thereof.

It is nevertheless generally understood that ε-caprolactam is preferably used as such in the manufacture of polymer (B).

The amount of monomer (FN) is not particularly limited, provided it can notably contribute to deliver the appropriate AEG and CEG, such that the AEG–CEG value is within claimed boundaries. The skilled in the art will determine the required amount according to routine experiments, taking notably into account the number of amine groups of the monomer (FN) and the final molecular properties which are sought for polymer (B).

It is nevertheless generally understood that the monomer (FN) is used in an amount such that the molar ratio monomer (FN)/ε-caprolactam is of at least 0.005 and/or of at most 0.1.

When the monomer (FN) is a trifunctional polyamine monomer, said monomer (FN) is used in an amount such that the molar ratio monomer (FN)/ε-caprolactam is of at least 0.01, preferably at least 0.02, more preferably at least 0.03 and/or of at most 0.1, more preferably of at most 0.08, even more preferably of at most 0.06.

When the monomer (FN) is a tetrafunctional polyamine monomer, said monomer (FN) is used in an amount such that the molar ratio monomer (FN)/ε-caprolactam is of at least 0.005, preferably at least 0.01, and/or of at most 0.05, preferably of at most 0.04.

The mixture (B) leading by polycondensation to the polymer (B) can additionally comprise at least one diacid [acid (DA)], as above detailed for polymer (A) and/or at least one diamine [amine (NN)], as above detailed for polymer (A). Preferably, the mixture (B) is free from any amine (NN) as above detailed.

Preferred embodiments are those wherein said mixture (B) comprises preferably at least one said acid (DA), optionally in combination with at least one said amine (NN), being nevertheless understood that mixture (B) is preferably free from amine (NN).

Without being bound by this theory, the Applicant is of the opinion that the said acid (DA) in said mixture (B) can be beneficial for modulating melt viscosity of the polymer (B), which will be hence more easily recovered in molten state from the polymerization reactor and more easily processed in subsequent compounding.

Acid (DA) used in mixture (B) can be an acid (AL) or an acid (AR), as above detailed. Preferably, the acid (DA) used in mixture (B) will be an acid (AL), as above detailed, possibly in combination with minor amount of an acid (AR), as above detailed. Best results have been obtained when the mixture (B) comprised adipic acid, as acid (DA).

When present in the mixture (B) for the manufacture of polyamide (B), the acid (DA) is used in an amount such that the molar ratio acid (DA)/monomer (FN) does not exceed the boundary $0.44+1/x$, wherein x is the number of said amine groups in the monomer (FN).

Hence, when the monomer (FN) is a trifunctional polyamine monomer comprising three said amine groups, the molar ratio acid (DA)/monomer (FN) does not exceed the boundary $0.44+1/3$, i.e. 0.7733.

Minimum amount of acid (DA) is not particularly critical, and will be preferably selected by one of ordinary skills in the art as a function of target molecular weight, i.e. enabling obtaining polymer (B) with a number averaged molecular weight of at least 5000 g/mol.

It is further understood that, when present, the acid (DA) will be present in an amount such that the total number of carboxylic groups of the acid (DA) is less than the total number of the amine groups of the monomer (FN), and more precisely such that the difference AEG−CEG is of at least 100 meq/kg.

Polymerization of mixture (B) leading to polymer (B) can be realized following standard techniques known in the art for the manufacture of PA6 and/or PA66; such techniques might involve notably continuous polymerization processes or discontinuous polymerization processes.

In polymer (B), the difference AEG−CEG is of advantageously at least 150 meq/kg, preferably at least 200 meq/kg, more preferably at least 400 meq/kg.

Polymer (B) is advantageously semi-crystalline, that is to say, it possesses a distinguishable melting point. Polymer (B) advantageously possesses a melting point comprised in the range of from 150 to 250° C.

Polymer (B) advantageously possesses a melt viscosity when measured at 250° C., at a shear rate of 100 s$^{-1}$ of 10 to 5000 Pa×s.

Polymer (B) advantageously possesses a number averaged molecular weight of at least 5000 g/mol.

The Thermal Stabilizers

The composition (C) also comprises one or more than one heat stabilizer or anti-oxidant [stabilizer (S)], in above recited amount.

One or more than one stabilizer (S) can be used in the composition (C) of the present invention.

Thermal stabilizers (S) well known in the art for the thermal stabilization of polyamides can be effectively used.

Stabilizers (S) to be used in the composition (C) are generally selected from the group consisting of copper-containing stabilizers, hindered amine compounds, hindered phenol compounds, polyhydric alcohols (PHA), and phosphorous compounds.

The Copper-Containing Stabilizer

Stabilizer (S) preferably comprises at least one copper-containing stabilizer. While these copper containing stabilizers can be used alone in the composition (C), it may also be possible to use the same in combination with one or more of above mentioned recited alternative stabilizers (S).

Preferred embodiments are nevertheless those wherein the copper-containing stabilizer is used alone, that is to say that the stabilizer (S) is a copper-containing stabilizer.

Copper-containing stabilizers useful in the practice of the invention may be characterized as comprising a copper compound [compound (Cu)] and an alkali metal halide [halide (M)]. More particularly, the copper-containing stabilizer will consist essentially of a copper compound [compound (Cu)] selected from the group consisting of copper (I) oxide, copper (II) oxide, copper (I) salt, for example cuprous acetate, cuprous stearate, a cuprous organic complex compound such as copper acetylacetonate, a cuprous halide or the like; and an alkali metal halide [halide (M)]. According to certain preferred embodiments, the copper-containing stabilizer will consist essentially of a copper halide selected from copper iodide and copper bromide and the alkali metal halide will preferably be selected from the iodides and bromides of lithium, sodium and potassium.

A particularly preferred combination is the combination of CuI and KI. Another very advantageous combination is the mixture of Cu$_2$O and KBr.

The copper-containing stabilizer will preferably consists of a copper compound [compound (Cu)], preferably with Copper in oxidation state +I, and an alkali metal halide [halide (M)] wherein the atomic weight ratio Cu:halide, i.e. the weight ratio between the overall Copper content of the compound (Cu) and the overall halogen content of the halide (M) and possibly of the compound (Cu) (if this latter comprises halogen) is of 1:99 to 30:70, preferably 5:95 to 20:80. A weight ratio Cu:halide which has been found particularly effective is of about 0.15 (i.e. corresponding to about 13:87).

The combined weight of compound (Cu) and halide (M), i.e. of the copper-containing stabilizer, in the composition (C) will amount to from about 0.01 to about 3 wt %, preferably from about 0.02 to about 2.5% wt, more preferably from about 0.1 to about 1.5 wt %, based on the total weight of composition (C).

The amount of the compound (Cu) in the copper-containing stabilizer will generally be sufficient to provide a level of from about 25 to about 1000 ppm, preferably of about 50 to about 500 ppm, more preferably of about 75 to about 150 ppm of Copper in the composition (C).

The Hindered Amine Compound

The expression "hindered amine compound" is used according to its customary meaning in this field and generally intended to denote derivatives of 2,2,6,6-tetramethyl piperidine well known in the art (see for example: *Plastics Additives Handbook,* 5th ed., Hanser, 2001). The hindered amine compound of the composition according to the present invention may either be of low or high molecular weight.

The hindered amine compounds of low molecular weight have typically a molecular weight of at most 900, preferably at most 800, more preferably of at most 700, still more preferably at most 600 and most preferably of at most 500 g/mol.

Examples of low molecular weight hindered amine compounds are listed in Table 1 below:

TABLE 1

| Formula |
| --- |
| (a1) |
| (a2) |
| (a3) |
| (a4) |

TABLE 1-continued
Formula
(a5)
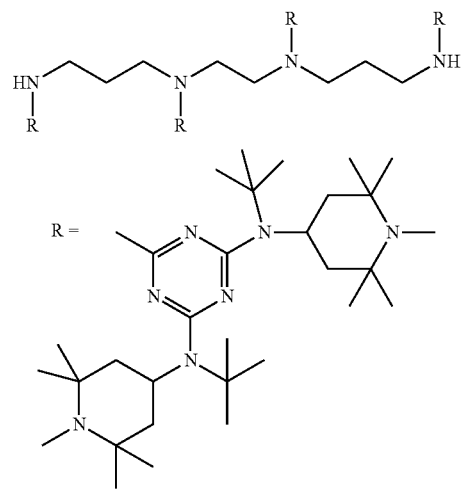
(a6)
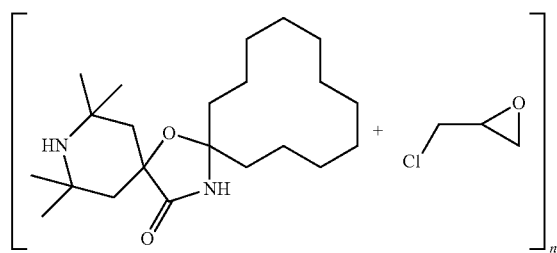
(a7)
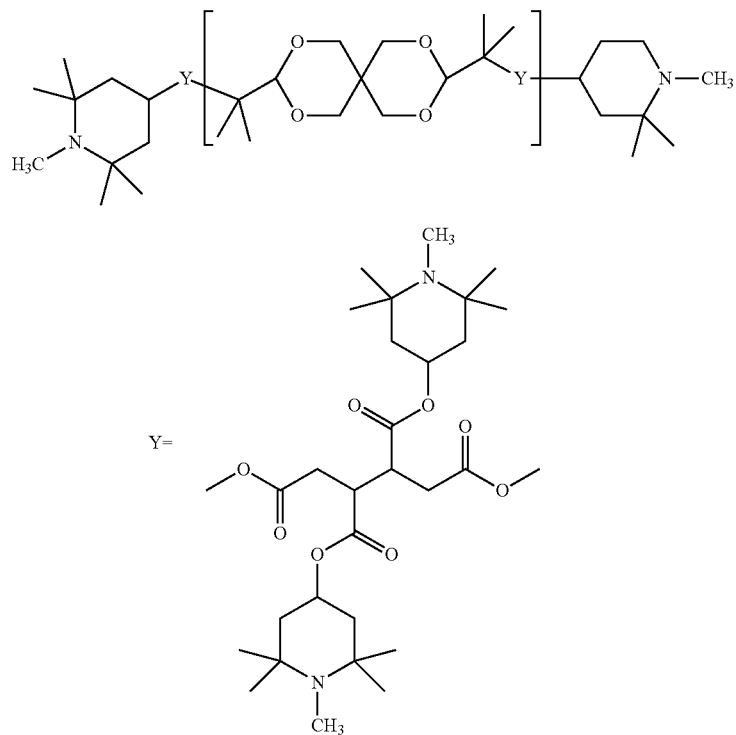

TABLE 1-continued
Formula
(a8)
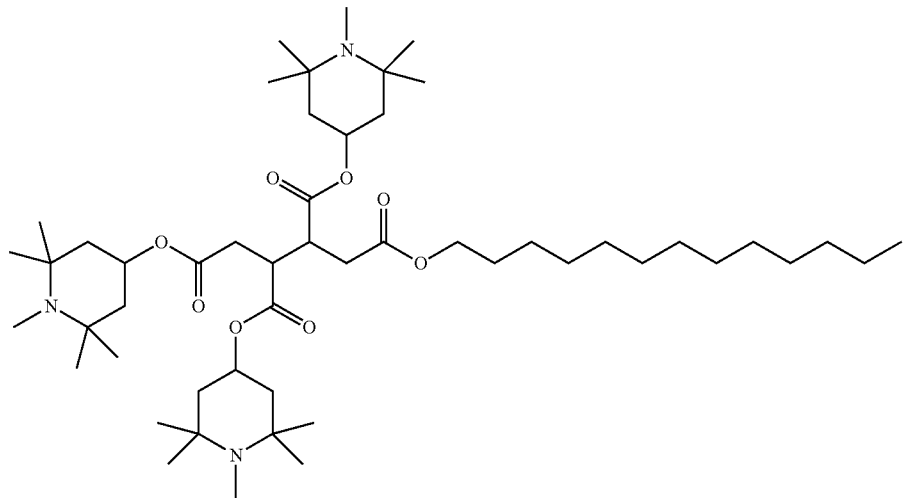 [SMILES: CCCCCCCCCCCCCOC(=O)CC(C(=O)OC1CC(C)(C)N(C)C(C)(C)C1)C(CC(=O)OC1CC(C)(C)N(C)C(C)(C)C1)C(=O)OC1CC(C)(C)N(C)C(C)(C)C1]
(a9)
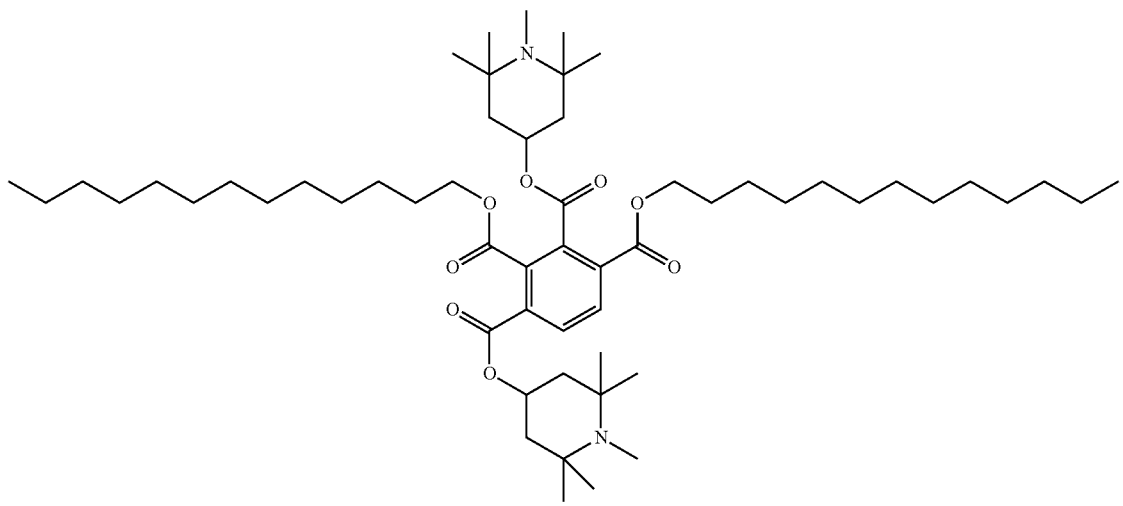 [SMILES: CCCCCCCCCCCCCOC(=O)c1ccc(C(=O)OC2CC(C)(C)N(C)C(C)(C)C2)c(C(=O)OCCCCCCCCCCCCC)c1C(=O)OC1CC(C)(C)N(C)C(C)(C)C1]
(a10)
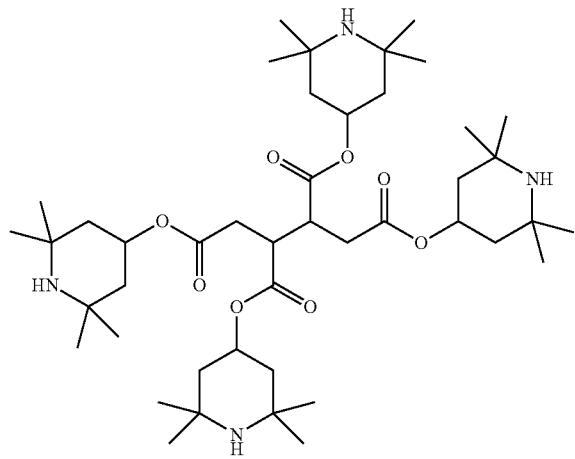

TABLE 1-continued

| Formula |
|---|
| (a11) 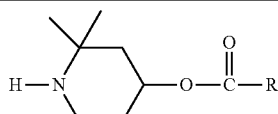 |
| (a12) |

Among those low molecular weight compounds, the hindered amine is preferably selected from the group consisting of the ones corresponding to formula (a1), (a2), (a11) and (a12). More preferably, the hindered amine is selected from the group consisting of the ones corresponding to formula (a1), (a2), and (a12). Still more preferably, the hindered amine is the one corresponding to formula (a2).

The hindered amine compounds of high molecular weight are typically polymeric and have typically a molecular weight of at least 1000, preferably at least 1100, more preferably of at least 1200, still more preferably at least 1300 and most preferably of at least 1400 g/mol.

Examples of high molecular weight hindered amine compounds are listed in Table 2 below:

TABLE 2

| Formula |
|---|
| (b1) 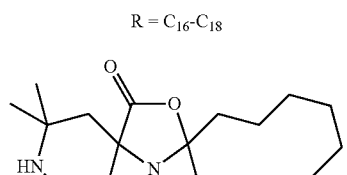 |
| (b2) |

TABLE 2-continued

Formula (b3)
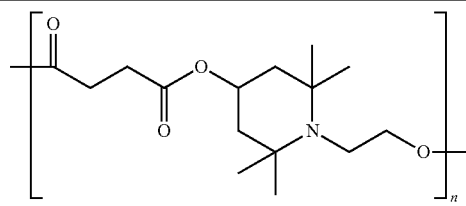

(b4)
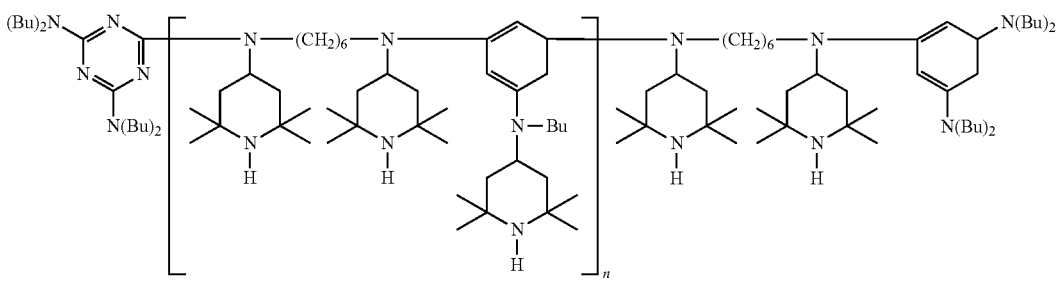

(b5)
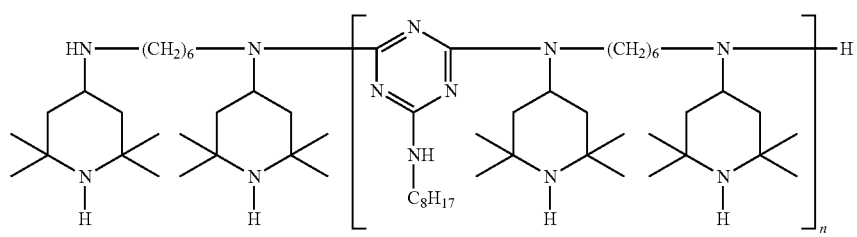

(b6)
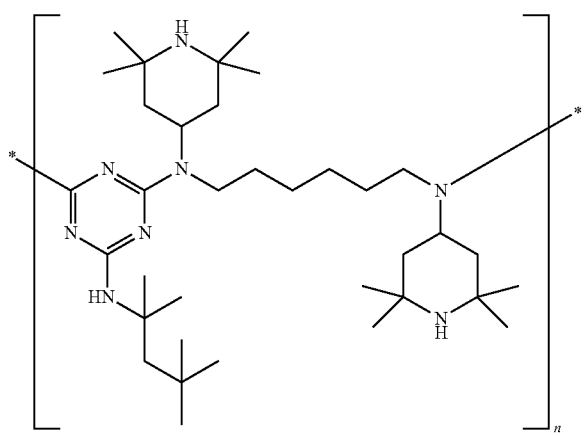

The "n" in the formulas (b1) to (b6) of Table 2 indicates the number of repeating units in the polymer and is usually an integral equal or greater than 4.

Among those high molecular weight compounds, the hindered amine is preferably selected from the group consisting of the ones corresponding to formula (b2) and (b5). More preferably, the high molecular weight hindered amine is the one corresponding to formula (b2).

If used, the hindered amine compound is typically present in an amount of advantageously at least 0.01 wt. %, more preferably at least 0.05 wt. %, still more preferably at least 0.1 wt. %, based on the total weight of the composition.

Similarly, when present, the hindered amine compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The Hindered Phenol Compound

The expression "hindered phenol compound" is used according to its customary meaning in this field and generally intended to denote derivatives of ortho-substituted phenol, especially (but not limited to) di-tert-butyl-phenol derivatives, well known in the art Examples of hindered phenol compounds are listed in Table 3 below:

TABLE 3

(d1) tetrakis(3-(3,5-di-tert-butyl-4-hydroxyphenyl) propionate), commercially available notably as Irganox ® 1010 stabilizer from BASF

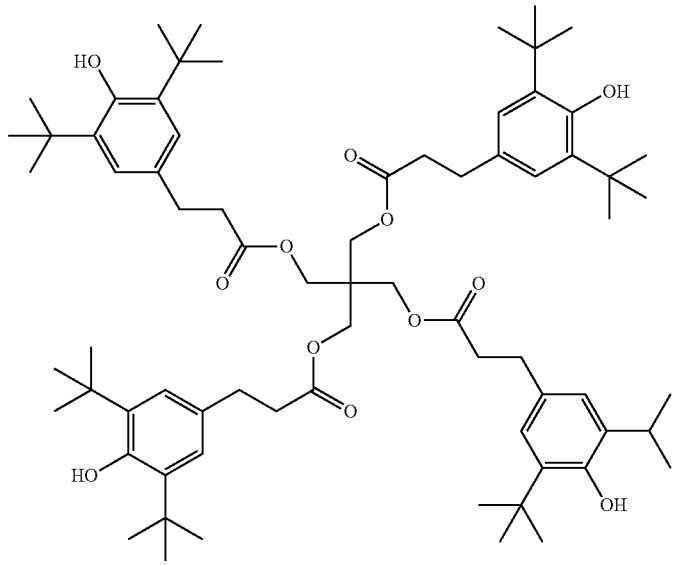 [SMILES: CC(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

(d2) Thiodiethylene bis[3-(3,5-di-tert.-butyl-4-hydroxy-phenyl) propionate], commercially available notably as Irganox ® 1035 stabilizer from BASF

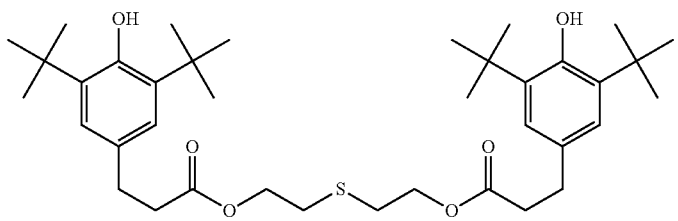 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

(d3) Octadecyl-3-(3,5-di-tert.butyl-4-hydroxy phenyl)-propionate, commercially available notably as Irganox ® 1076 stabilizer from BASF

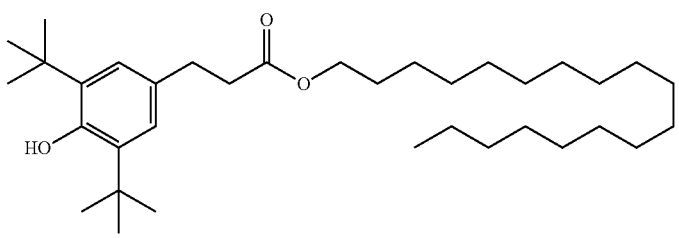 [SMILES: CCCCCCCCCCCCCCCCCCOC(=O)CCc1cc(C(C)(C)C)c(O)c(C(C)(C)C)c1]

(d4) N,N'-hexane-1,6-diylbis(3-(3,5-di-tert.-butyl-4-hydroxyphenylpropionamide)), commercially available notably as Irganox ® 1098 stabilizer from BASF

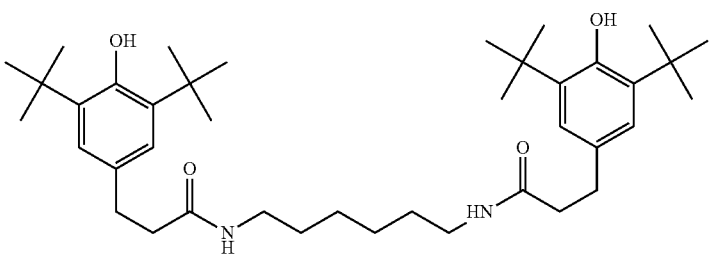 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE 3-continued (d5)
1,3,5-Trimethyl-2,4,6-tris(3,5-di-tert-butyl-
4-hydroxybenzyl)benzene,
commercially available notably as
Irganox ® 1330 stabilizer from BASF

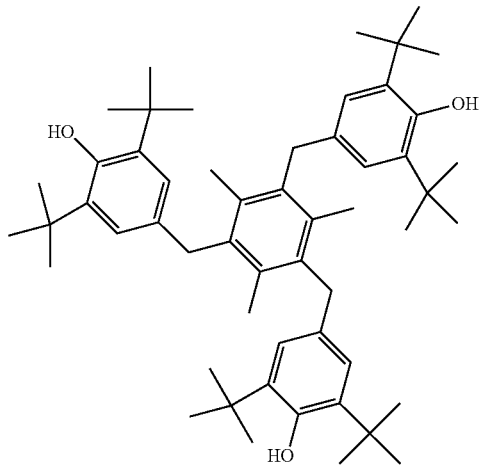 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

(d6)
Benzenepropanoic acid,
3,5-bis(1,1-dimethylethyl)-4-hydroxy-,
C7-C9 branched alkyl esters,
commercially available notably as
Irganox ® 1135 stabilizer from BASF

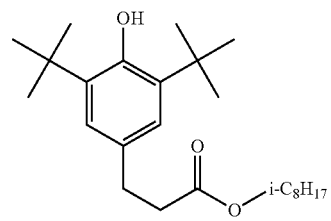

(d7)
Hexamethylene
bis[3-(3,5-di-tert-butyl-4-hydroxyphenyl)
propionate], commercially available
notably as Irganox ® 259 stabilizer from
BASF

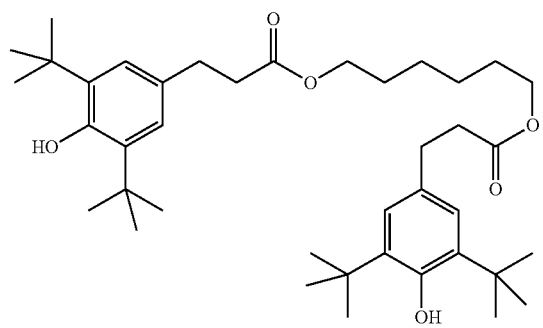 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

(d8)
Tris(3,5-di-tert-butyl-4-hydroxybenzyl)
isocyanurate, commercially available
notably as Irganox ® 3114 stabilizer
from BASF

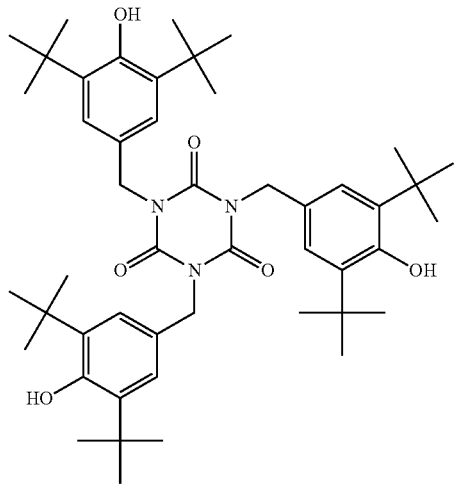 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE 3-continued

| | |
|---|---|
| (d9) 2,6-di-tert-butyl-4-(4,6-bis(octylthio)-1,3,5-triazin-2-ylamino)phenol, commercially available notably as Irganox ® 565 stabilizer from BASF | 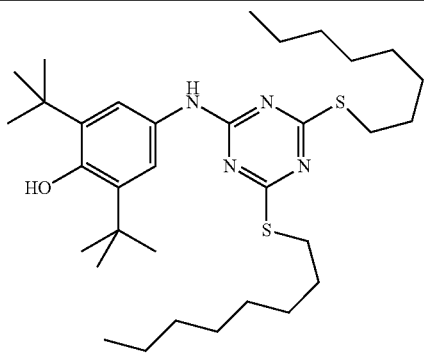 |
| (d10) commercially available notably as Irganox ® 1425 stabilizer from BASF | 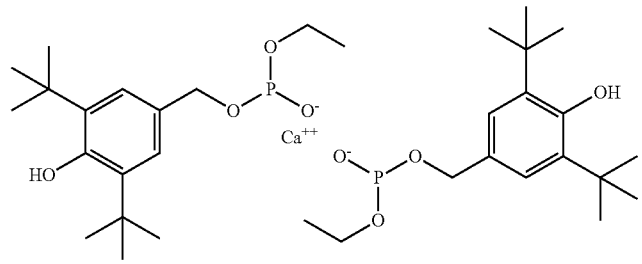 [SMILES: CCOP([O-])OCc1cc(C(C)(C)C)c(O)c(C(C)(C)C)c1 ; [Ca+2] ; CCOP([O-])OCc1cc(C(C)(C)C)c(O)c(C(C)(C)C)c1] |
| (d11) 2-Methyl-4,6-bis(octylsulfanylmethyl)phenol, commercially available notably as Irganox ® 1520 stabilizer from BASF | 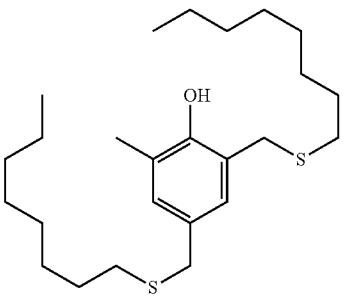 [SMILES: CCCCCCCCSCc1cc(C)c(O)c(CSCCCCCCCC)c1] |
| (d12) 2,4-Bis(dodecylthiomethyl)-6-methylphenol, commercially available notably as Irganox ® 1726 stabilizer from BASF | 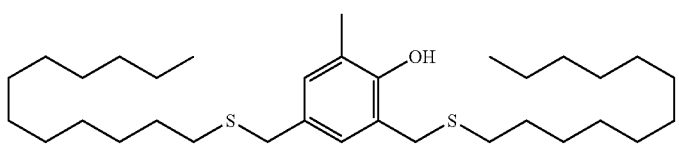 [SMILES: CCCCCCCCCCCCSCc1cc(C)c(O)c(CSCCCCCCCCCCCC)c1] |
| (d13) Triethylene glycol bis(3-tert-butyl-4-hydroxy-5-methylphenyl)propionate, commercially available notably as Irganox ® 245 stabilizer from BASF | 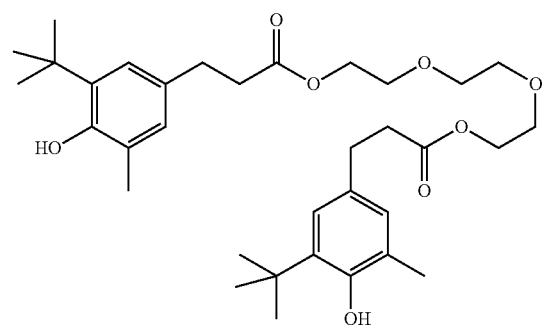 [SMILES: Cc1cc(CCC(=O)OCCOCCOCCOC(=O)CCc2cc(C)c(O)c(C(C)(C)C)c2)cc(C(C)(C)C)c1O] |

A hindered phenol compound which has been found particularly effective in the composition (C) is N,N'-hexane-1,6-diylbis(3-(3,5-di-tert.-butyl-4-hydroxyphenylpropionamide)) of formula (d4), as above specified.

If used, the hindered phenol compound is typically present in an amount of advantageously at least 0.01 wt. %, more preferably at least 0.05 wt. %, still more preferably at least 0.1 wt. %, based on the total weight of the composition.

Similarly, when present, the hindered phenol compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The Polyhydric Alcohols

The stabilizer (S) may be at least one polyhydric alcohol (PHA).

The expression "polyhydric alcohol" and "PHA" is used within the context of the present invention for designating an organic compound containing three or more hydroxyl groups in the molecule. The PHA can be an aliphatic, cycloaliphatic, arylaliphatic or aromatic compound, and may comprise one or more than one heteroatoms, including N, S, O, halogen and/or P, and can comprise additional functional groups (other than hydroxyl groups) such as ether, amine, carboxylic acid, amide or ester groups.

According to preferred embodiments, when used as stabilizer (S), the PHA complies with formula R—(OH)$_n$ (I) wherein:

n is an integer of 3 to 8, and preferably 4 to 8; and
R is a $C_1$-$C_{36}$ hydrocarbon radical.

Generally, hydroxyl groups of the PHA are bound to aliphatic carbon atoms; in other terms, the PHA is generally not a phenol-type compound.

Further, it is generally preferred for said hydroxyl group of not being sterically hindered. To this aim, the carbon atoms in alpha position to the aliphatic carbon bringing the hydroxyl group are generally free from sterically hindered substituents, and more specifically free from branched aliphatic groups.

PHA compounds particularly suitable for being used as stabilizer (S) within the frame of the present invention are notably:

triols, in particularly selected from the group consisting of glycerol, trimethylolpropane, trimethylolbutane, 2,3-di(2'-hydroxyethyl)-cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)-propane-1,2-diol, 2-(2'-hydroxyethoxy)-hexane-1,2-diol, 6-(2'hydroxypropoxy)-hexane-1,2-diol, 1,1,1-tris-[(2'-hydroxyethoxy)-methylethane, 1,1,1-tris-[(2'-hydroxypropoxy)-methyl-propane, 1,1,1-tris-(4'-hydroxyphenyl)ethane, 1,1,1-tris-(hydroxyphenyl)-propane, 1,1,5-tris-(hydroxyphenyl)-3-methylpentane, trimethylolpropane ethoxylate, trimethylolpropane propoxylate, tris(hydroxymethyl)aminomethane, N-(2-Hydroxy-1,1-bis(hydroxymethyl)ethyl)glycine (also know as tricine), and salts thereof;

tetraols, in particularly selected from the group consisting of diglycerol, di(trimethylolpropane), pentaerythritol, 1,1,4-tris-(dihydroxyphenyl)-butane;

polyols comprising 5 hydroxyl groups, in particular triglycerol;

polyols comprising 6 hydroxyl groups, in particular dipentaerythritol;

polyols comprising 8 hydroxyl groups, in particular tripentaerythritol;

saccharide-type polyols, in particular selected from the group consisting of cyclodextrine, D-mannose, glucose, galactose, sucrose, fructose, arabinose, D-mannitol, D-sorbitol, D- or L-arabitol, xylitol, iditol, talitol, altritol, gulitol, erythrol, threitol, D-gulono-1,4-lactone.

PHA which have been found to provide particularly good results within the frame of the present invention are diglycerol, triglycerol, pentaerythritol, dipentaerythritol (DPE), tripentaerythritol (TPE) and di(trimethylolpropane), with dipentaerythritol (DPE) and tripentaerythritol (TPE) being preferred, and dipentaerythritol (DPE) particularly preferred.

It is further understood that said PHA may react with the polyamide (A) and/or the polyamide (B).

It is hence generally understood that, when the stabilizer is or comprises PHA, embodiments wherein at least a fraction of said PHA is bound to the polyamide (A) and/or to the polyamide (B) are still within the scope of the present invention.

According to these latter embodiments, the fraction of PHA which can be thus bound to the polyamide molecule is of at least 50% moles, preferably at least 70% moles, even more preferably at least 80% moles, with respect to the total moles of PHA used.

When used as stabilizer (S), the PHA is present in an amount of at least 0.1% wt, preferably of at least 0.5% wt, even more preferably at least 0.75% wt and of at most 3.5% wt, preferably of at most 3% wt, even more preferably of at most 2.5% wt, with respect to the weight of the polyamide (A).

When at least part of the PHA is chemically bound to the polyamide (A) and/or polyamide (B), it is acknowledged that the composition (C) will comprise, if any, non-chemically bonded PHA in an amount of less than 2% wt, preferably of less than 1.5% wt, more preferably of less than 1% wt, with respect to the total weight of the composition (C).

The Phosphorous Compound

The stabilizers (S) may be at least one phosphorous compound selected from the group consisting of an alkali or alkali earth metal hypophosphites, phosphite esters, phosphonites and mixtures thereof.

Sodium and calcium hypophosphites are preferred alkali or alkali earth metal hypophosphites.

A phosphite ester may be represented by the formula P(OR)$_3$, while a phosphonite may be represented by the formula P(OR)$_2$R, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

Examples of phosphite esters are listed in the Table 4 below:

TABLE 4

Formula (e1)

TABLE 4-continued
Formula
(e2)
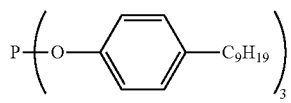
(e3)
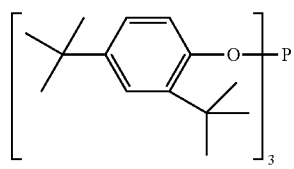
(e4)
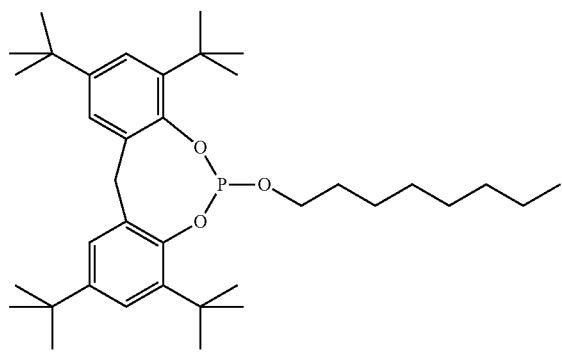 [SMILES: CCCCCCCCOP1Oc2c(cc(C(C)(C)C)cc2C(C)(C)C)Cc2cc(C(C)(C)C)cc(C(C)(C)C)c2O1]
(e5)
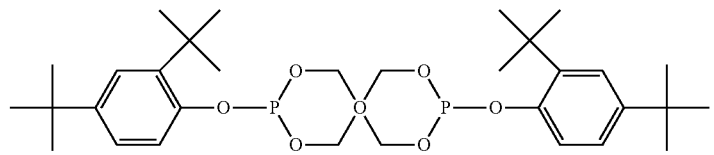
(e6)
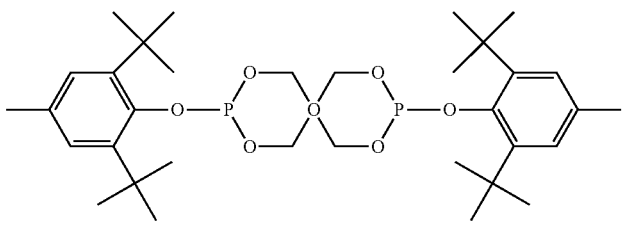
(e7)
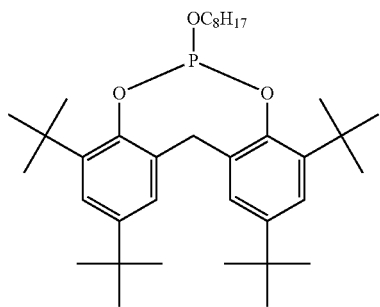

TABLE 4-continued
| Formula | |
|---|---|
| (e8) | 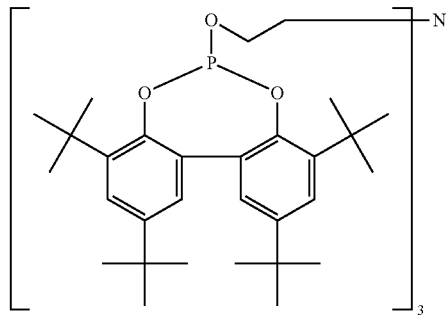 |
| (e9) | 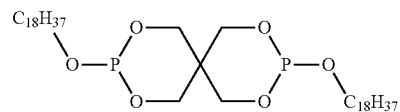 |
| (e10) | 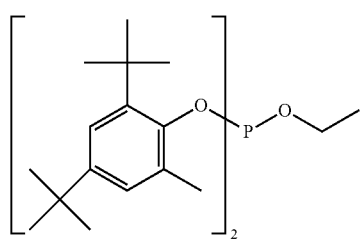 |
| (e11) | 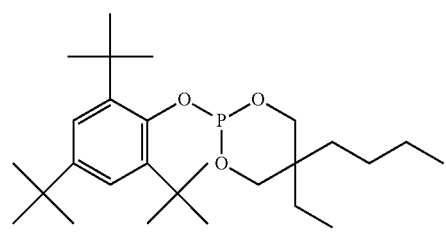 [SMILES: CCCCC1(CC)COP(Oc2c(C(C)(C)C)cc(C(C)(C)C)cc2C(C)(C)C)OC1] |
| (e12) | 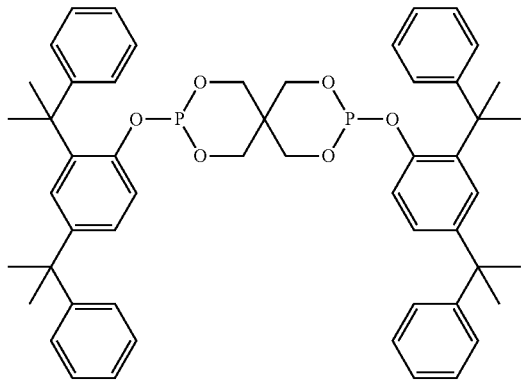 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1] |

Examples of phosphonites are listed in the table 5 below:

TABLE 5

| Formula | Structure |
|---|---|
| (f1) | *(chemical structure)* |
| (f2) | *(chemical structure)* |

When used in the composition (C), the phosphorous compound is preferably present in an amount of at least 0.01 wt. %, more preferably at least 0.05 wt. %, based on the total weight of the composition.

The phosphorous compound is also preferably present in an amount of at most 1 wt. %, more preferably at most 0.5 wt. %, still more preferably at most 0.25 wt. %, based on the total weight of the composition.

The Filler (F)

The composition optionally comprises from 0 to 60% wt, preferably from 10 to 50% wt of one or more than one filler (F).

Said filler (F) can be any reinforcement agent, but it is preferably selected from the group consisting of calcium carbonate, glass fibers, glass flakes, glass beads, carbon fibers, talc, mica, wollastonite, calcined clay, kaolin, diatomite, magnesium sulphate, magnesium silicate, barium sulphate, titanium dioxide, sodium aluminium carbonate, barium ferrite, potassium titanate.

The filler (F), from morphology perspective, can be hence selected from fibrous fillers and particulate fillers.

Preferably, the filler is chosen from fibrous fillers. Among fibrous fillers, glass fibers are preferred; they include chopped strand A-, E-, C-, D-, S- and R-glass fibers. Glass fibers with circular and non-circular cross sections can be used. The expression 'glass fibers with non-circular cross section' is used herein according to its usual meaning, that is to say it is intended to refer to glass fibers having a cross section having a major axis lying perpendicular to longitudinal direction of the glass fiber and corresponding to the longest linear distance in the cross-section, and a minor axis, corresponding to the linear distance in cross-section in a direction perpendicular to the major axis. The non-circular cross section of the fiber may have a variety of shapes including cocoon-type shape, a rectangual shape, an elliptical shape, a polygonal shape, an oblong shape, without this list being exhaustive. The ratio of the length of the major axis to the minor axis is preferably between about 1.5:1 to about 6:1, more preferably between about 2:1 to about 5:1, still more preferably between about 3:1 to about 4:1.

In preferred embodiments, glass fibers, and more particularly, circular cross-section glass fibers will be used as filler (F).

The composition (C) will comprise preferably at least 15% wt, more preferably at least 20% wt of filler (F), as above detailed, with respect to the total weight of the composition (C).

Still, the composition (C) comprises usually at most 60% wt, preferably at most 55% wt, even more preferably at most 50% wt of filler (F), as above detailed, with respect to the total weight of the composition (C).

Particularly good results have been obtained when the composition (C) comprised from about 10 to about 40% wt of filler (F), as above detailed, with respect to the total weight of the composition (C).

Rubber (I)

The composition (C) optionally comprises from 0 to 20% wt of at least one impact modifying rubber [rubber (I)].

Rubbers (I) suitable for use in the composition (C) generally comprise at least one functional group able to react with the polyamide (A), and more particularly with amine or carboxylic acid end groups of the polyamide (A) [functionalized rubber (IF)].

The functional group of the functionalized rubber (IF) is generally selected from carboxylic acid groups and derivatives thereof (including notably salts and esters); epoxy groups; anhydride groups, oxazoline groups, maleimide groups or mixture thereof.

The functionalized rubber (IF) may be an oligomer or polymer compound, wherein the functional groups can be incorporated by copolymerizing a functional monomer during polymerization of the impact modifier backbone or by grafting of a pre-formed polymer backbone.

Said functionalized rubbers (IF) generally comprise recurring units derived from at least one of the following monomers: ethylene; higher alpha olefins including propylene, butene, octene; dienes, including butadiene and isoprene; acrylates, styrene, acrylonitrile; (meth)acrylic acid and derivatives thereof, including esters; vinyl monomers, including vinyl acetate, and other vinyl esters. Other monomers may be equally comprised in the structure of the functionalized rubber (IF).

The polymer backbone of the functionalized rubber (IF) will generally be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

It is understood that in case no functional group is comprised in said polymer backbone, the functionalized rubber (IF) will further incorporate, by copolymerization or grafting, residues from functional monomers including any of carboxylic acid groups and derivatives thereof (including notably salts and esters); epoxy groups; anhydride groups, oxazoline groups, maleimide groups or mixture thereof. It is further envisioned that said functional monomers may be used for further modifying backbones which may already comprise a functional group.

Specific examples of functionalized rubbers (IF) are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene-maleimide copolymers grafted with maleic anhydride; SEBS copolymers grafted with maleic anhydride; styrene-acrylonitrile copolymers grafted with maleic anhydride; ABS copolymers grafted with maleic anhydride.

Functionalized rubbers (IF) which have been found particularly effective within the frame of the present invention are ethylene amorphous copolymers grafted with maleic anhydride.

When present, the amount of said rubber (I) is generally of at least 1% wt, preferably 2% wt, more preferably at least 3% wt, more preferably at least 4% wt, with respect to the total weight of the composition (C). Still, its amount is generally of at most 15% wt, preferably at most 10% wt, more preferably at most 8% wt, with respect to the total weight of the composition (C).

Other Ingredients

The composition (C) may also comprise other conventional additives commonly used in the art, including lubricants, plasticizers, colorants, pigments, antistatic agents, flame-retardant agents, nucleating agents, catalysts, and the like. When present, these ingredients are present in an amount of at most 20% wt, preferably of at most 10% wt, more preferably of at most 8% wt, with respect to the total weight of the composition (C). Typical amounts are depending of the specific conventional additive selected for incorporation in the composition (C) and will be selected by the skilled in the art according to common practice.

Manufacture of the Composition (C)

The invention further pertains to a method of making the composition (C) as above detailed, said method comprising melt-blending the polyamide (A), the polyamide (B), the stabilizer (S), and any other optional ingredient.

Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

Use of the Composition (C)

The composition (C), as disclosed above, is useful in increasing long-term thermal stability at high temperatures of molded or extruded articles made therefrom. The long-term heat stability of the articles can be assessed by exposure (air oven ageing) of 4 mm thick test samples at various test temperatures in an oven for various test periods of time. The oven test temperatures for the composition disclosed herein include 210° C. and up to 2000 hours test periods. The test samples, after air oven ageing, are tested for tensile strength and elongation to break, according to ISO 527-2/1A test method; and compared with unexposed controls having identical composition and shape, that are as molded. The comparison with the as molded controls provides the retention of tensile strength and/or retention of elongation to break, and thus the various compositions can be assessed as to long-term heat stability performance.

In various embodiments the composition (C) has a 210° C./1000 hours retention of tensile strength of at least 60% and preferably at least 70%, based upon comparison with as molded non-exposed controls.

In another aspect, the present invention relates a use of the above disclosed composition (C) for high temperature applications.

In yet another aspect, the present invention relates to a method for manufacturing an article by shaping the composition (C) of the invention. Examples of articles are films, yarns, fibers, laminates, automotive parts or engine parts or electrical/electronics parts. By "shaping", it is meant any shaping technique, such as for example extrusion, injection moulding, thermoform moulding, compression moulding or blow moulding. Preferably, the article is shaped by injection moulding or blow moulding.

The molded or extruded thermoplastic articles disclosed herein may have application in many vehicular components that meet one or more of the following requirements: high impact requirements; significant weight reduction (over conventional metals, for instance); resistance to high temperature; resistance to oil environment; resistance to chemical agents such as coolants; and noise reduction allowing more compact and integrated design. Specific molded or extruded thermoplastic articles are selected from the group consisting of charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers. As an illustrative example of desired mechanical resistance against long-term high temperature exposure, a charge air cooler can be mentioned. A charge air cooler is a part of the radiator of a vehicle that improves engine combustion efficiency. Charge air coolers reduce the charge air temperature and increase the density of the air after compression in the turbocharger thus allowing more air to enter into the cylinders to improve engine efficiency. Since the temperature of the incoming air can be more than 200° C. when it enters the charge air cooler, it is required that this part be made out of a composition maintaining good mechanical properties under high temperatures for an extended period of time.

Should the disclosure of any patents, patent applications, and publications which are incorporated herein by reference conflict with the description of the present application to the extent that it may render a term unclear, the present description shall take precedence.

The present invention is further illustrated by the following examples. It should be understood that the following examples are for illustration purposes only, and are not used to limit the present invention thereto.

Analyses

Viscosity Number (VN) (unit: mL/g) was determined in solution in formic acid according to ISO307 standard.

Carboxylic acid End-Groups (CEG) concentration and Amine End-Groups (AEG) concentration were determined by potentiometric titration (unit: meq/kg).

Melting temperature ($T_m$) and enthalpy ($\Delta H_m$), crystallization temperature ($T_c$) were determined by Differential Scanning Calorimetry (DSC), using a Perkin Elmer Pyris 1 at 10° C./min.

Raw Materials

The polyamides compounds were manufactured using following ingredients:

Stabamid® 26AE2 PA66, which is a polyamide 66 from Solvay (VN=134 mL/g), having more carboxylic acids than amino end groups (PA66, herein after);

PA 6 S27, which is a linear PA6 from Solvay synthesized by polymerizing ε-caprolactam in presence of acetic acid as an end-capping agent, followed by removal of oligomers by washing in water, having VN=142 mL/g, AEG=37 meq/kg, and CEG=54 meq/kg; and hence a AEG−CEG value of −17 meq/kg (PA6, herein after);

PA6 PSB280, which is a PA6 from Solvay, synthesized by polymerizing ε-caprolactam in presence of 5-aminoisophthalic acid and isophorone diamine, followed by removal of oligomers by washing in water, having VN=207.5 mL/g, AEG=43.9 meq/kg, and CEG=44.0 meq/kg and hence AEG−CEG substantially of −0.1 meq/kg (T-PA6, herein after);

branched polyamide 6 synthesized by polymerizing ε-caprolactam in presence of bis(hexamethylene)triamine, adipic acid, water (30 wt.-%) and $H_3PO_4$ as a catalyst (370 ppm of the mixture of monomers) with the following molar ratios: n(adipic acid)/n(ε-caprolactam)=0.03, n(bis(hexamethylene)triamine/n(ε-caprolactam)=0.04, and n(adipic acid)/n(bis(hexamethylene)triamine=0.75, followed by removal of oligomers by washing in water; this branched polyamide has VN=132.6 mL/g, AEG=487.8 meq/kg and CEG=14.4 meq/kg, and hence AEG−CEG=473.4 meq/kg (B-PA6, herein after);

Vetrotex OCV 983 Glass fibers from Owens Corning;

CuI and KI from AJAY® Europe;

General Procedure for Extrusion of Compounds and High Heat Long Term Ageing Testing Before extrusion, pellets of the polyamides were dried to decrease water content below 1500 ppm. The compositions were obtained by melt blending of the selected ingredients in a WERNER&PLEIFEDER® ZSK 40 twin-screw extruder using the following parameters: 35 kg/hour, 280 rounds per minute, 8 heating zone set-points: 250, 255, 260, 260, 265, 270, 275, 280° C. All ingredients were fed at the beginning of the extruder. The extruded strand was cooled in a water bath, then pelletized and the obtained pellets were stored into sealed aluminium lined bags to prevent moisture absorption.

Ingredients used for the preparation of comparative compositions CE0 to CE4 and for the preparation of inventive composition E1 are summarized in Table 6 herein below:

TABLE 6

| % wt | CE0 | CE1 | CE2 | CE3 | CE4 | E1 |
|---|---|---|---|---|---|---|
| PA66 | 64.7 | 54.7 | 44.7 | 54.7 | 44.7 | 54.7 |
| PA6 | — | 10 | 20 | — | — | — |
| T-PA6 | — | — | — | 10 | 20 | — |
| B-PA6 | — | — | — | — | — | 10 |
| GF | 35 | 35 | 35 | 35 | 35 | 35 |
| CuI | 0.04 | 0.04 | 0.04 | 0.04 | 0.04 | 0.04 |
| KI | 0.26 | 0.26 | 0.26 | 0.26 | 0.26 | 0.26 |

The compositions were injection-molded using a DEMAG® 50T injection molding machine at 290° C. with a mold temperature of 80° C. to prepare 4 mm thick ISO527 samples. Before ageing, initial mechanical properties [Tensile modulus (TM), tensile strength at break ($TS_B$) and Elongation at break ($TE_B$)] were determined by tensile measurements according to ISO 527/1A at 23° C., as average values from 5 specimens.

The samples were heat aged in a re-circulating air oven (Heraeus TK62120) set at 210° C. At various heat ageing times (500 h, 1000 h and 2000 h), the samples were removed from the oven, allowed to cool to room temperature and placed into sealed aluminium lined bags until ready for testing. Mechanical properties were measured according to the same procedure as before ageing.

The retention of tensile strength at break ($TS_B$) is expressed as the percentage of the ratio of the value of the mechanical property after a certain heat ageing time at the temperature of 210° C. and the value of the mechanical property before ageing. For example, for a heat ageing time of 500 h at 210° C., retention is expressed as percentage of $TS_B$ (500 h, 210° C.)/$TS_B$(initial).

The mechanical properties of the samples before and after air oven ageing are reported in Table 7 below.

TABLE 7

|  | CE0 | CE1 | CE2 | CE3 | CE4 | E1 |
|---|---|---|---|---|---|---|
| Before heat ageing | | | | | | |
| TM (MPa) | 12042 | 10892 | 11284 | 11331 | 10815 | 11110 |
| $TS_B$ (MPa) | 206.5 | 190.1 | 194.3 | 197.0 | 189.3 | 194.3 |
| $TE_B$ (%) | 3.3 | 3.5 | 3.8 | 3.9 | 4.0 | 3.5 |
| After 500 h of heat ageing at 210° C. | | | | | | |
| $TS_B$ (MPa) | 155.0 | 160.6 | 166.7 | 158.0 | 165.3 | 186.5 |
| $R_{500\,h}$ (%) | 75 | 85 | 86 | 80 | 87 | 96 |
| After 1000 h of heat ageing at 210° C. | | | | | | |
| $TS_B$ (MPa) | 83.1 | 113.4 | 91.1 | 115.7 | 98.7 | 138.0 |
| $R_{1000\,h}$ (%) | 40 | 60 | 47 | 59 | 52 | 71 |
| After 2000 h of heat ageing at 210° C. | | | | | | |
| $TS_B$ (MPa) | Brittle | Brittle | Brittle | Brittle | Brittle | 32.9 |
| $R_{2000\,h}$ (%) | | | | | | 17 |

TM (MPa): Tensile modulus; $TS_B$ (MPa): Tensile strength at break; $TE_B$ (%): Tensile strain (or elongation) at break; $R_{500\,h}$: retention $TS_B$ (%) after 500 h at 210° C.; $R_{1000\,h}$: retention $TS_B$ (%) after 1000 h at 210° C.; $R_{2000\,h}$: retention $TS_B$ (%) after 2000 h at 210° C.

The data summarized in Table 7 above well demonstrate that the branched PA6 having AEG–CEG=474 meq/kg, when used in comparable concentration in a PA66 matrix, brought better heat stability to the glass fibers reinforced compound, than what the addition of linear PA6 or branched PA6 having AEG~CEG were shown to provide, in comparison to reference compound (CE0) deprived of any ε-caprolactam-based polyamide.

The invention claimed is:

1. A polyamide composition comprising:
from 20 to 95% wt of at least one first polyamide;
from 1 to 30% wt of at least one branched polyamide different from the first polyamide,
said branched polyamide comprising recurring units derived from polycondensation of a polycondensation reaction mixture comprising:
at least one polyamine monomer comprising at least three amine functional groups selected from the group consisting of secondary amine group of formula —NH— and primary amine group of formula —NH2, and
ε-caprolactam or a derivative thereof;
said branched polyamide possessing a concentration of amine end groups and a concentration of carboxylic end groups such that the difference of the concentration of amine end groups minus the concentration of carboxylic end groups is at least 100 meq/kg; and
from 0.01 to 3.5% wt of at least one thermal stabilizer,
optionally, from 0 to 60% wt of at least one filler;
optionally, from 0 to 20% wt of at least one impact modifying rubber;
optionally, from 0 to 20% wt of other conventional additives,
with above % wt being referred to the total weight of composition.

2. The composition of claim 1, wherein said first polyamide is obtained by condensation reaction of at least one mixture selected from:
mixtures comprising at least a diacid (or derivative thereof and at least a diamine or derivative thereof;
mixtures comprising at least a lactam;
mixtures comprising at least an aminocarboxylic acid; and combinations thereof.

3. The composition of claim 2, wherein said first polyamide is obtained by condensation reaction of at least one mixture selected from the group consisting of:
mixtures of adipic acid and 1,6-diaminohexane;
mixtures of adipic acid, terephthalic acid and 1,6-diaminohexane;
mixtures of sebacic acid and 1,6-diaminohexane,
mixtures of terephthalic acid and 1,10-diaminodecane,
mixtures of adipic acid, terephthalic acid and 1,10-diaminodecane, and
mixtures of adipic acid and 1,10-diaminodecane.

4. The composition of claim 1, wherein said polyamine monomer is a trifunctional polyamine monomer comprising three amine groups, or a tetrafunctional polyamine monomer comprising four amine groups.

5. The composition of claim 4, wherein said polyamine monomer is selected from the group consisting of tris(aminoalkyl)amines; polyoxyalkylenetriamines; polyalkylenepolyamines, 1,8-diamino-4-aminomethyl-octane and dialkylenetriamines.

6. The composition of claim 1, wherein the polyamine monomer is used in said polycondensation reaction mixture in an amount such that the molar ratio of polyamine monomer to ε-caprolactam is at least 0.005 and/or at most 0.1.

7. The composition according to claim 1, wherein said polycondensation reaction mixture additionally comprises at least one diacid and/or at least one diamine.

8. The composition according to claim 7, wherein the diacid is present in the polycondensation reaction mixture in an amount such that the molar ratio of diacid to polyamine monomer does not exceed the boundary 0.44+1/x, wherein x is the number of amine groups in the polyamine monomer.

9. The composition according to claim 1, wherein said stabilizer is selected from the group consisting of copper-containing stabilizers, hindered amine compounds, hindered phenol compounds, polyhydric alcohols, and phosphorous compounds.

10. The composition according to claim 9, wherein said stabilizer comprises at least one copper-containing stabilizer.

11. The composition of claim 10, wherein said copper-containing stabilizer comprises a copper compound and an alkali metal halide.

12. The composition of claim 11, wherein said copper-containing stabilizer comprises a copper compound and an alkali metal halide in an atomic weight ratio of copper to halide of 1:99 to 30:70.

13. The composition according to claim 11, wherein the combined weight of the copper compound and the alkali metal halide is from about 0.01 to about 3 wt %, based on the total weight of composition.

14. A method of making the composition according to claim 1, said method comprising melt-blending the first polyamide, the branched polyamide, the copper-containing stabilizer, and, optionally, any ingredient selected from the group consisting of fillers, impact modifying rubbers, and other conventional additives.

15. A method for manufacturing an article by shaping the composition according to claim 1, by a shaping technique selected from the group consisting of extrusion, injection moulding, thermoform moulding, compression moulding, and blow moulding.

16. The method according to claim 15, wherein the article is selected from the group consisting of films, yarns, fibers, laminates, automotive parts, engine parts, and electrical/electronics parts.

17. The composition of claim 5, wherein said polyamine monomer is selected from the group consisting of tris(2-aminoethyl)amine, polyoxypropylenetriamine, polyethyleneimine, 1 diethylenetriamine, bis(hexamethylene)triamine, cyclohexane-1,3,5-triamine, and 1,8-diamino-4-aminomethyl-octane.

18. The composition of claim 5, wherein said polyamine monomer is selected from the group consisting of bis(hexamethylene)triamine, tris(2-aminoethyl)amine, 1,8-diamino-4-aminomethyl-octane, and combinations thereof.

19. The composition of claim 6, wherein:
the polyamine monomer is a trifunctional polyamine monomer and the molar ratio of polyamine monomer to ϵ-caprolactam is at least 0.01 and at most 0.1, or
the polyamine monomer is a tetrafunctional polyamine monomer, and the molar ratio of polyamine monomer to ϵ-caprolactam is at least 0.005 and at most 0.05.

20. The composition of claim 12, wherein the atomic weight ratio of copper to halide is from 5:95 to 20:80.

* * * * *